Jan. 31, 1933.　　　F. G. JOHNSON　　　1,895,835
PHOTOGRAPHIC FLASH LIGHT APPARATUS
Filed May 15, 1931
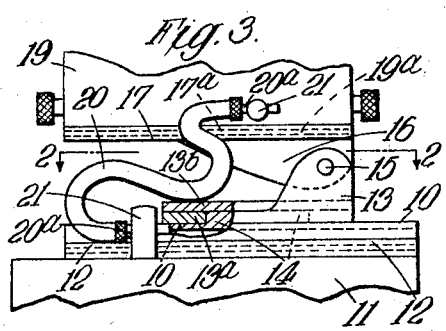
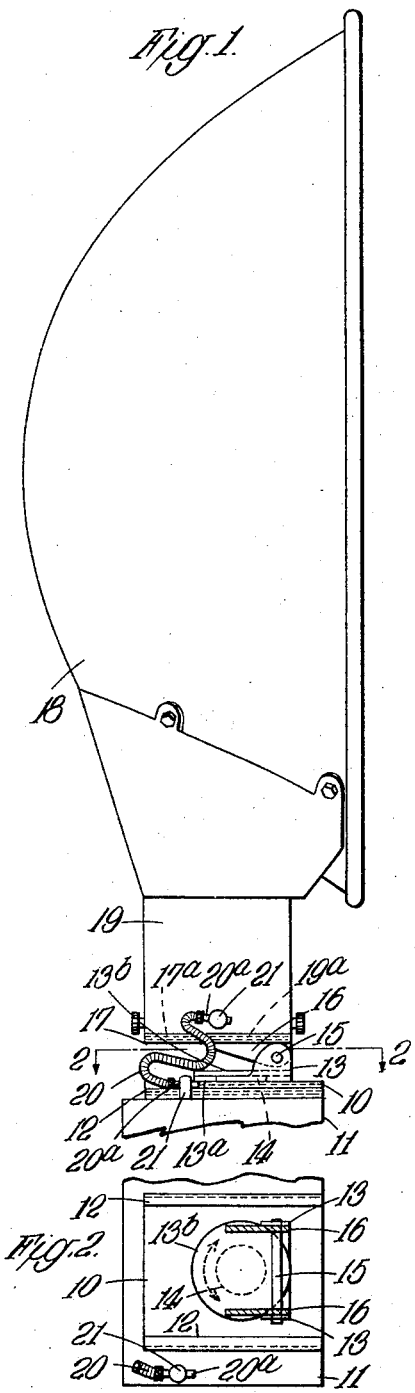
Inventor:
Frederick George Johnson
By [signature]
Attorney.

Patented Jan. 31, 1933

1,895,835

UNITED STATES PATENT OFFICE

FREDERICK GEORGE JOHNSON, OF LONDON, ENGLAND

PHOTOGRAPHIC FLASH-LIGHT APPARATUS

Application filed May 15, 1931, Serial No. 537,684, and in Great Britain April 21, 1931.

This invention relates to photographic flash-light apparatus of the type which comprises a reflector for a photographic flash-lamp in combination with a camera.

When using a combined apparatus of this type particularly for indoor photography it frequently happens that it is desirable to utilize daylight to a certain extent, while at the same time throwing artificial light from the flash-lamp angularly upon the subject to be photographed. The present invention provides means whereby this result may be obtained in an extremely simple and efficient manner, but it should be understood that the invention is not limited in any way to this particular application.

According to the invention, and primarily with the above mentioned object in view, the reflector is mounted upon the camera by means of a device which permits an angular and rotative movement of the reflector relatively to the camera, so that the light from the photographic flash-lamp disposed within the reflector is thrown at any desired angle.

According to the invention moreover, the reflector for the photographic flash-lamp is mounted on the camera by means of a device which comprises a member or element enabling the reflector to be tilted in a vertical plane, and also an element in rotative association with the first mentioned element for the purpose of directing the light from the reflector at any desired angle.

In order that the invention may be better understood and readily carried into effect, three embodiments thereof will now be described with reference to the accompanying drawing wherein:—

Figure 1 is a general side view of a reflector mounted upon a camera, broken away, by means of a device according to the invention.

Figure 2 is a plan of the device on the line 2—2 of Figure 1.

Figure 3 is a fragmentary side view of the device shown in Figure 1, drawn to an enlarged scale.

In the embodiment of the invention shown in Figures 1, 2 and 3 a plate 10 is removably mounted upon the camera 11 as by guides 12 in which the plate 10 is slidable, and has an upstanding bracket 13 rotatably associated therewith. This upstanding bracket 13 may be secured to a collar 13a which encircles a shallow boss 14 on the plate 10 so as to be rotatable thereupon. The collar 13a may be held on the boss 14 by means of a plate 13b secured to the boss. The bracket 13 which as shown comprises two upstanding ears or projections, is provided with a horizontal hinge member or rod 15 upon which an upper bracket 16 is pivotally mounted and this upper bracket 16 in turn has a plate 17 provided with parallel guides 17a attached thereto. The reflector 18 for the photographic flash-lamp as shown has combined therewith a small electric battery disposed within a casing 19 forming an integral part of the reflector unit and the lower part of the casing 19 is provided with tongues or flanges 19a which slide in the guides 17a on the upper plate 17.

When the apparatus is of the type in which means are provided on the camera 11 for igniting the photographic flash-lamp upon operating the shutter release mechanism, a flexible conductor 20 is provided for completing the electrical circuit from the shutter release mechanism of the camera to the electric battery. The flexible conductor 20 may advantageously be formed with a plug 20a at each end to co-operate with socket terminals 21 which are preferably swivelling, upon the camera 11 and the casing 19 of the electric battery respectively.

It will be appreciated that by means of the invention it is possible in an extremely simple and efficient manner to direct the light from the photographic flash-lamp on to a surface or the like which reflects the light at any desired angle on to the subject to be photographed whilst at the same time using daylight with its consequential characteristic effects.

The hinge elements, as 13, 13a, 14, 15 and 16, as shown in Figs. 1 to 3, are in the front of the apparatus but they can also be provided in the rear, or as shown but reversed.

What I claim is:

1. A support for mounting a flash-lamp device upon a photographic camera, comprising in combination parallel guides upon the upper side of said photographic camera, a plate slidable within said parallel guides, a boss on said plate, a collar rotatable on said boss, upstanding brackets on said collar, a reflector of a photographic device, parallel guides upon the base of said reflector, a plate slidable in said parallel guides and members depending from said plate and horizontally hinged to said upstanding brackets.

2. A support for mounting a flash-lamp device upon a photographic camera, comprising in combination parallel guides upon the upper side of said photographic camera, a plate slidable within said parallel guides, a boss on said plate, a collar rotatable on said boss, upstanding brackets on said collar, a reflector of a photographic device, a casing for an electric battery formed integrally with said reflector, parallel guides on said casing, a plate slidable within said guides and members depending from said plate and horizontally hinged to said upstanding brackets, a swivelling apertured terminal on said housing, a swivelling apertured terminal on said photographic camera and a flexible current conductor cooperating with said swivelling apertured terminals by means of plug contacts.

3. A support for mounting a flash-lamp device upon a photographic camera, comprising in combination a plate mounted upon the upper side of said photographic camera, an element associated with said plate and rotatable thereupon, a second plate horizontally hinged to said element, a reflector of a photographic device, a housing for an electric battery formed integrally with said reflector and mounted upon said second plate, a terminal on said housing, a terminal on said photographic camera and a current conductor between said terminals.

In testimony whereof I hereunto affix my signature this 14th day of May 1931.

FREDERICK GEORGE JOHNSON.